United States Patent
Hofmann et al.

(10) Patent No.: US 6,267,133 B1
(45) Date of Patent: Jul. 31, 2001

(54) METHOD FOR MOUNTING A STEERING VALVE WITH A CENTRING UNIT

(75) Inventors: Hans Hofmann, Mögglingen; Andreas Kruttschnitt, Heidenheim; Wolfgang Walter, Schwäbisch Gmünd, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/508,263
(22) PCT Filed: Sep. 9, 1998
(86) PCT No.: PCT/EP98/05700
  § 371 Date: Mar. 9, 2000
  § 102(e) Date: Mar. 9, 2000
(87) PCT Pub. No.: WO99/14098
  PCT Pub. Date: Mar. 25, 1999

(30) Foreign Application Priority Data

Sep. 13, 1997 (DE) .............................. 197 40 352

(51) Int. Cl.⁷ ...................................... F15B 9/10
(52) U.S. Cl. ................. 137/15.21; 137/625.23; 91/375 A
(58) Field of Search ............... 91/375 A, 389; 137/625.22, 625.23, 14, 15.08, 15.27

(56) References Cited

U.S. PATENT DOCUMENTS

| | | | |
|---|---|---|---|
| 5,575,193 | * 11/1996 | Bareis et al. | 91/375 A |
| 5,769,121 | * 6/1998 | Breitweg | 137/625.23 |
| 5,957,027 | * 9/1999 | Gilbert et al. | 91/375 A |
| 6,026,858 | * 2/2000 | Gilbert | 137/625.21 |
| 6,052,900 | * 4/2000 | Campbell | 29/890.13 |

FOREIGN PATENT DOCUMENTS 39 34 468 A1  4/1990 (DE).
44 20 744 C2  7/1997 (DE).

* cited by examiner

*Primary Examiner*—A. Michael Chambers
(74) *Attorney, Agent, or Firm*—Larson & Taylor PLC

(57) ABSTRACT

A steering valve (1) for power-steering gears contains two valve elements (4, 8), which are rotatable relative to each other. A corresponding centering unit (16) contains two centering elements (17, 18), which are rotation-fixed relative to the valve elements (4, 8) and which—together with the valve elements (4, 8)—are rotatable and axially displaceable relative to each other. Both centering elements (17, 18) feature radially aligned grooves, between which anti-friction elements (26) are inserted.

Assembly is broken down into the following stages:

The two valve elements (4, 8)—without centering unit (16)—are centrally aligned and linked via torsion bar spring (12).

Separate from the steering valve (1), the two centering elements (17, 18) are pre-assembled in an assembly fixture and aligned in their mechanical center together with the anti-friction elements (26).

The two aligned valve elements (4, 8) are linked to the two aligned centering elements (17, 18) by first linking the first centering element (17) to the first valve element (4), whereby the first centering element is aligned relative to the first valve element by means of a rotation-fixed axial guide element (20) and the link is non-rotatable but axially displaceable, and then linking the second centering element (18) to the second valve element (8) via longitudinal press fit, whereby the link is established by means of axial displacement of the entire centering unit (16) along the non-rotatable axial guide element (20).

9 Claims, 1 Drawing Sheet

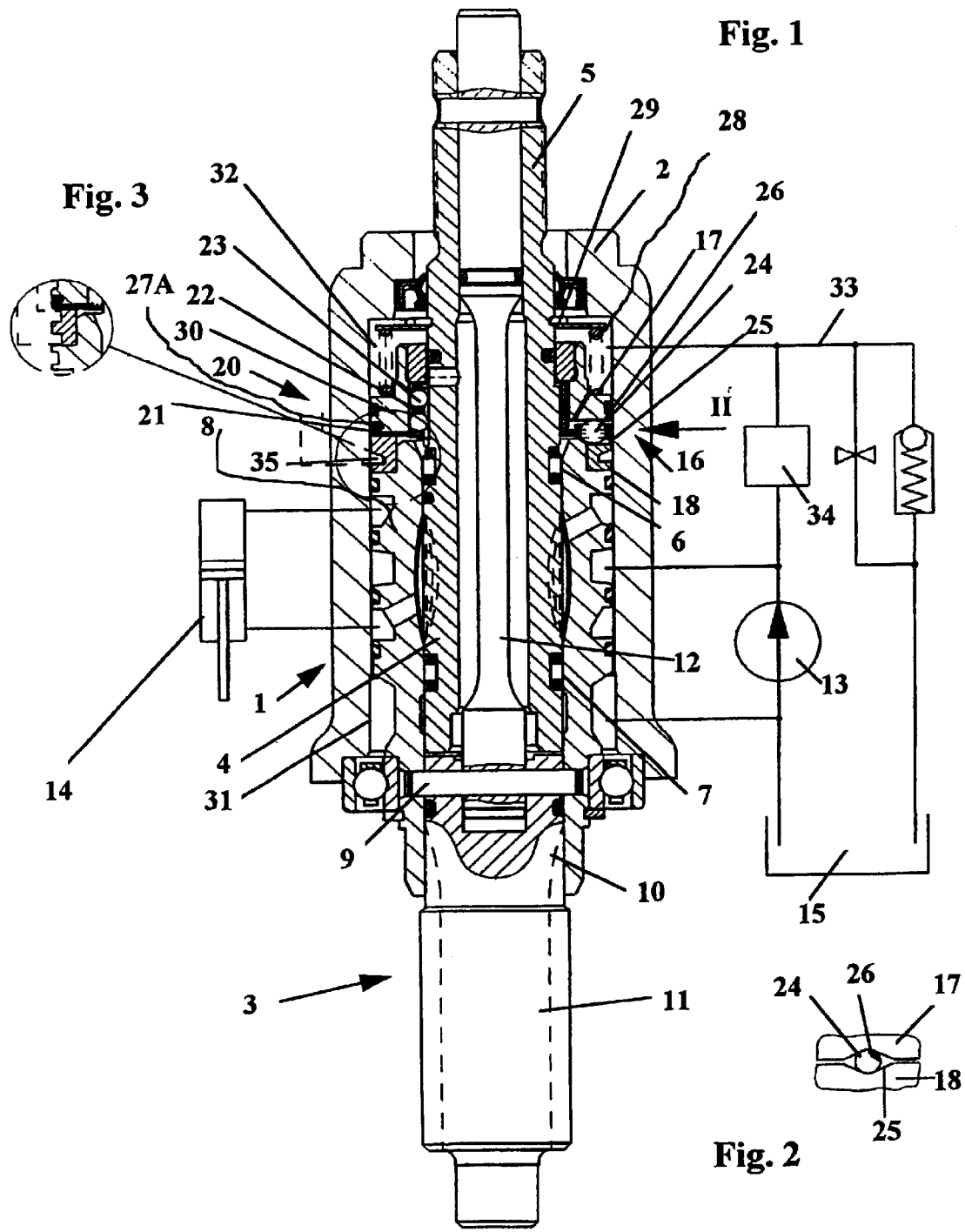

METHOD FOR MOUNTING A STEERING VALVE WITH A CENTRING UNIT

The invention concerns a method for the assembly of a steering valve with a centering device for hydraulic power steering systems, in particular for motor vehicles, in accordance with the nomen collectivum of claim 1. The steering valve contains a first valve element and a second valve element, with both valve elements being rotatable in relation to each other. The centering unit contains a first centering element and a second centering element, with both elements being rotatable and axially displaceable in relation to each other. At least one of the two centering elements can be actuated by means of a spring toward the other centering element. The centering elements have essentially radially arranged grooves facing each other, in which anti-friction elements can be inserted.

A steering valve with a centering device to which above method refers is known from EP-B1-646 080. With such steering valves, the two valve elements as well as the two centering elements must be very precisely aligned and fixed in relation to each other, for the mechanical center of the centering unit to correspond to the hydraulic center of the steering valve.

With the known steering valve with a centering unit, the second valve element forms a single part with the second centering element. Alignment of the mechanical center of the centering unit with the hydraulic center of the valve elements is effected by aligning the first centering element relative to the first valve element. To this end, the first centering element is initially rotatable relative to the axial lock. After alignment, rotation-locked connection of the parts is brought about. Connecting the parts by means of welding, however, may result in undesirable local warm-up.

The suggestion has been made, therefore, to separately produce the second centering element and the second valve element and to connect both during assembly. According to the proposal, after placement and alignment of the second centering element, the second valve element is to be connected to the second centering element by deforming a ring-shaped flange provided on the second valve element. This, however, involves the risk that the second valve element might not only be deformed in the area of its ring-shaped flange but also on its circumference and in the area of its control grooves. Moreover, such an assembly requires correct positioning of the first centering element relative to the first valve element to be followed by the alignment of the two centering elements relative to each other. This alignment is impaired by the friction between the second centering element and the second valve element. Such a combination of assembly, positioning, alignment and fixation by deforming components generally requires complex equipment.

The task of the invention is to present a precise and cost-effective assembly method. This task is solved by the method described in claim 1. The method involves the following steps:

The two valve elements of the steering valve—without centering unit—are hydraulically or pneumatically centered, and when aligned in their central position they are linked to each other by means of a torsion bar spring.

Separate from the steering valve, the two centering elements of the centering unit are pre-assembled in an assembly fixture and aligned in their mechanical center position together with the anti-friction elements, e.g. by applying an axial force.

The two centrally aligned valve elements of the steering valve are linked to the two centering elements (aligned in their mechanical center position) of the centering unit. To this end, the first centering element is aligned relative to the first valve element by means of a rotation-fixed axial guide element, and non-rotatable but axially displaceable connection is established. Then, by means of axial displacement of the entire centering unit along the non-rotatable axial guide element, the second centering element is linked to the second valve element via longitudinal press fit.

With this method, alignment of the centering elements relative to each other does not result in reaction torque from the centering unit acting on the steering valve, which could affect the centering of the valve elements.

The subordinate claims state the advantages and purpose-specific features of the invention. Assembly, for example, is facilitated if the second centering element has a radial, external circumferential groove for easy insertion of the assembly tool. The circumferential groove can be replaced by an assembly flange providing the same benefit. Circumferential groove or assembly flange are used for the alignment of parts and for assembly or pressing-on. It is of particular advantage if the circumferential groove, on its wall not facing the second valve element, features an insertion taper facilitating insertion of the assembly tool and if its wall facing the second valve element features an essentially flat surface for safe support of the assembly tool. To rule out the possibility that assembly of the press fit might have an influence on the sealing gap between the two valve elements, an anti-friction bearing—e.g. in the form of a needle bearing—may be disposed between the first and the second valve element in the axial area of the second centering element.

In the following, the invention is explained in more detail on the basis of two exemplary versions as shown in the drawings. The representations include:

FIG. 1: A longitudinal section through a steering valve with a centering unit.

FIG. 2: A partial view in the direction of the arrow II in FIG. 1.

FIG. 3: A partial view in accordance with section III in FIG. 1 in a second example.

A rack-and-pinion power steering gear is used as an example to explain the invention. But the invention may be used with the same effect for ball-and-nut power steering gears.

A steering valve 1 in the form of a rotary valve is contained in a valve housing 2 of a power steering gear 3. The steering valve I contains a first valve element 4 in the form of a rotary valve which is firmly linked to an input shaft 5. The first valve element 4 and the input shaft 5 are both rotatably guided via anti-friction bearings 6 and 7 in a second valve element 8. For the purpose intended, the anti-friction bearings 6 and 7 should be needle bearings. The second valve element 8 is designed as a valve bush and rotatably supported in the valve housing 2. Moreover, the second valve element 8 is firmly linked to an output shaft 10, for example by means of a pin 9. The output shaft 10 features a pinion 11, which is part of a rack-and-pinion power steering gear (not described in detail here) of the power steering system 3. If the steering valve 1 is not used in a rack-and-pinion power steering gear but in a ball-and-nut power steering gear, the pinion 11 is replaced by a steering worm.

Input shaft 5 and output shaft 10 are linked by a torsion bar spring 12, so that a limited degree of rotation is possible between input shaft 5 and output shaft 10 and thus between the first valve element 4 and the second valve element 8. By means of this rotation between the two valve elements, the pressure medium supplied by a servo pump 13 is fed to a working space of a servomotor 14 and returned by another working space to a pressure medium container 15.

A centering unit 16, which at the same time centers the steering valve and serves as a reaction device, supports the torsion bar spring 12 in its valve return action. The centering unit 16 contains two centering elements 17 and 18. By means of a rotation-fixed axial guide element 20, the first centering element 17 features a rotation-fixed but axially displaceable link with the input shaft 5 and thus the first valve element 4. The axial guide element 20 is provided on the first valve element 4 and on the first centering element 17 with interacting longitudinal grooves 21/22, between which balls 23 are inserted, which for their purpose should be contained in a ball cage. The second centering element 18 features a rotation-fixed and axially non-displaceable press-fit link with the second valve element 8. The second valve element 8 has a ring-shaped shoulder with a cylindrical outer surface for the press fit. The second centering element 18 features a cylindrical inner surface. A non-displaceable and non-rotatable press fit connects the two cylindrical surfaces of the second valve element 8 and the second centering element 18.

Each of the two centering elements 17 and 18 has at least one groove 24 and 25, with V-shaped inclined surfaces facing each other, with arc-shaped or similar cross-section. The grooves 24 and 25 are aligned mainly in radial direction. Between the grooves 24 and 25 there is an anti-friction element 26, for example a ball. The anti-friction element 26 should be contained in a cage 27. To facilitate assembly, the cage 27 features fastening lugs 27A which engage on one of the centering elements 17, 18.

The two centering elements 17 and 18 are compressed by a spring 28. The spring 28 in the example is a coil spring, but it can be replaced by a metal bellows or any other axially elastic spring, e.g. a set of leaf springs. The free end of the spring 28 is supported by a stop 29a, which on the first valve element 4, for example, is composed of a snap ring and a stop washer.

In the embodiment the first centering element 17 is composed of one piece together with a reaction piston 30. But the centering element 17 and the reaction piston 30 can also be produced separately and then linked to each other. The presence of a reaction piston is not essential to the invention. But if the reaction piston 30 is with sealing features guided on the input shaft 5 and in a valve bore 31 of the valve housing 2, then the reaction piston will enclose a reaction space 32, which can be fed with a steering force-dependent servo pressure via a line 33. In the familiar manner, the servo pressure can be influenced by means of an electro-hydraulic converter 34 in accordance with drive speed and/or other parameters.

In valve neutral position, the two valve elements 4 and 8 are arranged in a hydraulic central position relative to each other. The pressures in the two working spaces of the servomotor 14 are then equal. From this hydraulic center position, the two valve elements 4 and 8 can be turned in both directions relative to each other. This results in a rotation angle-dependent pressure increase in a rotation direction-aligned working space of the servomotor 14. The torsion bar spring 12 together with the parallel-actuated centering unit 16 bring about hydraulic center position of the two valve elements 4 and 8. Due to the axial forces acting on its first centering element 17, alignment of the centering unit 16 in its mechanical center is achieved. In this process, the force of the torsion bar spring 12 is supported by the nearly constant axial force of the spring 28 and the changeable hydraulic axial force from the reaction space 32.

The second centering element 18 features a radial, external circumferential groove 35. On the wall not facing the second valve element 8, the circumferential groove 35 features an insertion taper to facilitate the insertion of an assembly tool. On the other wall facing the second valve element 8, the circumferential groove 35 features an essentially flat surface for safe support of the assembly tool. An assembly flange 36 as shown in FIG. 3 may be used as an alternative to the circumferential groove 36.

In the following the method for the assembly of the steering valve 1 with the centering unit 16 is described in detail and step by step: A pressure medium is used to align the two valve elements 4 and 8—without the centering unit 16—in their center positions in which they are linked to each other by means of a torsion bar spring 12. Alignment may be effected with the aid of either a hydraulic or a pneumatic pressure medium.

Separate from the steering valve 1, the two centering elements 17 and 18 of the centering unit 16 are pre-assembled in an assembly fixture, and together with the anti-friction elements 26 they are aligned in their mechanical center. This alignment is, for example, effected by applying an axial force, for which the spring 28 may be used.

In a two-step process, the center-aligned valve elements 4 and 8 are then linked to the centering elements 17 and 18—aligned in their mechanical centers—of the centering unit. The pre-assembled centering unit 16 is slipped onto the first valve element 4, and by means of the axial guide element 20 is aligned with its first centering element 17, relative to the first valve element 4. It is essential that the axial guide element 20 is used both for assembly as well as for the operation of the steering valve 1 with the centering device 16. This ensures that the centering unit 16 establishes a rotation-fixed but axially displaceable link already with the first valve element 4. When the pre-assembled centering unit 16 is then further displaced on the first valve element 4 toward the second valve element 8, this results in the centering unit 16 together with its second centering element 18 being pushed onto the second valve element 8, which brings about a longitudinal press fit between the second centering element 18 and the second valve element 8.

The circumferential groove 35 or the assembly flange 36 already during pre-assembly serve as supports for the alignment of parts.

REFERENCES

1. Steering valve
2. Valve housing
3. Power steering gear
4. First valve element
5. Input shaft
6. Anti-friction bearing
7. Anti-friction bearing
8. Second valve element
9. Pin
10. Output shaft
11. Pinion
12. Torsion bar spring
13. Servo pump
14. Servomotor
15. Pressure medium container
16. Centering unit
17. First centering element
18. Second centering element 19. -
20. Axial guide element
21. Longitudinal groove
22. Longitudinal groove
23. Ball
24. Groove
25. Groove
26. Anti-friction element
27. Cage
27A. Fastening lug
28. Spring
29. Stop
29. -
30. Reaction piston
31. Valve bore
32. Reaction space
33. Line
34. Converter
35. Circumferential groove
36. Assembly flange

What is claimed is:

1. A method for the assembly of a steering valve with a centering unit for a hydraulic power steering system;
   in which the steering valve includes a first valve element and a second valve element, which are rotatable relative to each other,
   in which the centering unit includes a first centering element and a second centering element, which are fixed against relative rotation with respect to the respective valve element and, in common with the valve elements, are rotatable relative to one another, and of which at least one centering element can be urged in the direction of the other centering element by the force of a spring, and
   in which the centering elements have substantially radially oriented grooves associated with one another between which roller bodies can be inserted,
   said method comprising the following steps:
   aligning the two valve elements of the steering valve, initially without a centering unit, with their center position by a pressure medium, and joining the two valve elements via a torsion bar spring in this position;
   pre-assembling the two centering elements of the centering unit in an assembly device separately from the steering valve and aligning the two centering elements together with the roller bodies with their mechanical centering center,
   joining the two valve elements of the steering valve that are aligned with their center positions with the two centering elements of the centering unit that are aligned with their mechanical centering center, wherein
   first, via a rotationally fixed axial guide, the first centering element is joined to the first valve element in a manner that is aligned with it and is fixed against relative rotation but axially displaceable relative to it, and
   after that, by axial displacement of the entire centering unit along the rotationally fixed axial guide, the second centering element is joined to the second valve element via longitudinal press fit.

2. The steering valve with a centering unit that has been assembled by the method defined in claim 1,
   wherein the second centering element has a radially outward-located circumferential groove for the introduction of an assembly tool.

3. The steering valve with a centering unit that has been assembled by the method defined in claim 1,
   wherein the second centering element has a radially outward-located assembly flange for the introduction of an assembly tool.

4. The steering valve with a centering unit according of claim 2,
   wherein the circumferential groove, on its wall remote from the second valve element, has an introduction cone for easier insertion of an assembly tool, and that its wall oriented toward the second valve element has an essentially flat surface for a secure support of the assembly tool.

5. The steering valve of claim 2,
   wherein a roller bearing is disposed between the first and the second valve element in the axial region of the second centering element.

6. The steering valve of claim 5,
   wherein the roller bearing is a needle bearing.

7. The steering valve of claim 1,
   wherein the non-rotatable axial guide serves the purpose not only of assembly but also operation of the steering valve with the centering unit.

8. The steering valve of claim 2,
   wherein the roller bodies are retained in a cage.

9. The steering valve of claim 8,
   wherein the cage has fastening lugs with which it can be snapped onto one of the centering elements.

* * * * *